(12) United States Patent
Schulzki

(10) Patent No.: US 7,732,716 B2
(45) Date of Patent: Jun. 8, 2010

(54) WEIGHING DEVICE AND METHOD BASED ON DIFFERENCE MEASUREMENT

(75) Inventor: Alexander Schulzki, Stelzenberg (DE)

(73) Assignee: WIPOTEC Wiege-- Und Positioniersysteme GmbH, Kaiserslautern (DE)

( * ) Notice: Subject to any disclaimer, the term of this patent is extended or adjusted under 35 U.S.C. 154(b) by 153 days.

(21) Appl. No.: 11/918,715

(22) PCT Filed: Apr. 19, 2006

(86) PCT No.: PCT/DE2006/000686
§ 371 (c)(1), (2), (4) Date: Oct. 18, 2007

(87) PCT Pub. No.: WO2006/111147
PCT Pub. Date: Oct. 26, 2006

(65) Prior Publication Data
US 2009/0057034 A1 Mar. 5, 2009

(30) Foreign Application Priority Data
Apr. 19, 2005 (DE) ........................ 10 2005 018 228

(51) Int. Cl.
*G01G 15/00* (2006.01)
(52) U.S. Cl. .......................................... 177/1; 177/145
(58) Field of Classification Search ...................... 177/1, 177/145
See application file for complete search history.

(56) References Cited

U.S. PATENT DOCUMENTS

| | | | | |
|---|---|---|---|---|
| 4,709,770 A | * | 12/1987 | Kohashi et al. | 177/50 |
| 5,004,093 A | * | 4/1991 | Blezard | 198/430 |
| 5,125,465 A | * | 6/1992 | Schneider | 177/50 |
| 5,388,043 A | * | 2/1995 | Hettinger | 600/300 |
| 6,455,002 B1 | | 9/2002 | Jokes et al. | |
| 6,825,423 B2 | * | 11/2004 | Eaton et al. | 177/1 |
| 7,586,049 B2 | * | 9/2009 | Wurz | 177/25.13 |
| 2004/0000436 A1 | | 1/2004 | Eaton et al. | |

FOREIGN PATENT DOCUMENTS

| | | |
|---|---|---|
| DE | 44 09 908 A1 | 10/1994 |
| DE | 196 09 431 A1 | 9/1997 |
| DE | 100 27 144 A1 | 6/2001 |
| DE | 102 32 136 A1 | 1/2004 |

* cited by examiner

*Primary Examiner*—Randy W Gibson
(74) *Attorney, Agent, or Firm*—Breneman & Georges

(57) ABSTRACT

The invention provides a weighing device for a production machine or installation and a method for weighing piece goods from a production machine or installation, which can be implemented in a space-saving manner and/or permit processing of piece goods within a large belt width in the format of the piece goods. According to the invention, this is achieved in that the weight of two or more piece goods (7', 7") and the weight which is varied by subsequent feeding or discharge of an individual piece good (7") or a number of piece goods to be jointly weighed are detected from which the weight of an individual piece good (7") or a number of piece goods to be jointly weighed is determined from the difference between the weights.

29 Claims, 2 Drawing Sheets

WEIGHING DEVICE AND METHOD BASED ON DIFFERENCE MEASUREMENT

Figure 1:
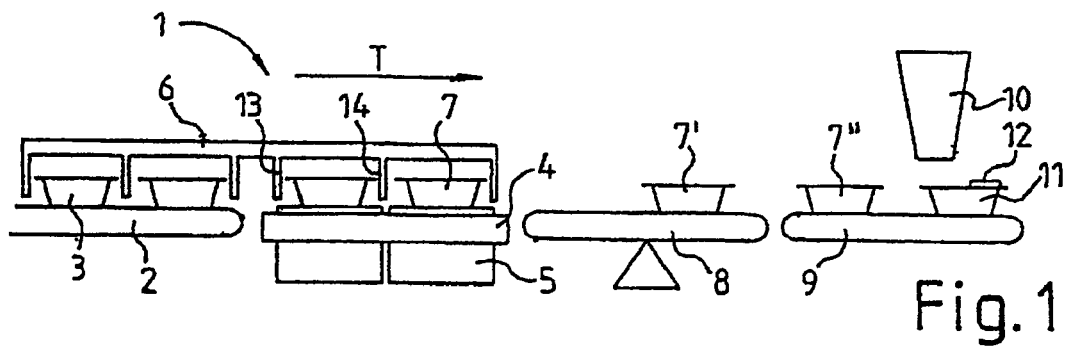

BACKGROUND OF THE INVENTION (1) Field of the Invention

The invention relates to a weighing device and a weighing method for a production machine and/or installation for determining the weight of individual piece goods or individual groups of piece goods within a production line with scales which have a weighing receptacle for two or more piece goods as well as a method of determining the weight of individual piece goods or individual groups of piece goods within a production line. More particularly the invention pertains to a method or a machine having an evaluation unit for determining the difference between two weight values in a machine or process in which a feeding device feeds two or more piece goods into a weighing receptacle for jointly weighing the two or more piece goods to provide a first weight value and where one of the two or more piece goods are successively removed from the weighing receptacle to provide a second weight value.

(2) Description of Related Art Including Information Disclosed Under 37 C.F.R. 1.97 and 1.98

Monitoring scales are frequently used in production machines or installations to check the weight of the piece goods produced. Monitoring scales such as this are used, for example, in DE 196 09 431 to weigh packages of products. In this device, individual piece goods are conducted by means of a weighing belt and weighed during transportation on the weighing belt. The product is then labeled by means of a downstream labeling unit, with the weight information being applied in particular. Devices of this type are commercially available as separate weighing and labeling machines and are usually attached to a delivery belt of a production machine or installation.

With this type of monitoring scales, the weighing device has to be matched to the format of the piece good to be weighed. The largest provided piece good to be weighed has to have space on the weighing belt, with the result that the dimensions of said weighing belt have to be correspondingly large. However, this means that the belt speed has to be correspondingly increased when weighing a small piece good in order to ensure sufficient product throughput.

Furthermore, for individual weighing purposes, it is necessary to separate the piece goods arriving from the production machine or installation, as a result of which the complexity and also the space requirement are increased.

BRIEF SUMMARY OF THE INVENTION

In contrast, the object of the invention is to provide a device and a method for weighing, which can be implemented in a space-saving manner and/or permit processing of piece goods within a large belt width with respect to the size of the piece goods.

Starting from a device and a method of the type discussed in the Description Of Related Art Including Information Disclosed Under 37 C.F.R. 1.97 and 1.98 the advantages of the invention are achieved by a weighing device or a production machine having a weighing device in which a feeding device feeds two or more piece goods to a weighing receptacle in the weighing device which jointly weighs the two or more piece goods and in which a device successively discharges individual piece goods or groups of piece goods and an evaluation unit which determines the weight of a piece good or group of piece goods from the difference in weight values. The method of the invention involves placing two or more piece goods on a weighing receptacle and weighing the two or more piece goods and determining the group weight and successively removing one of the piece goods and utilizing an evaluation unit to determine the difference between the two weight values. Alternatively the method of the invention involves successively feeding two or more piece goods onto a weighing receptacle and successively obtaining the weight of one or more piece goods on the weighing receptacle and then discharging one of the one or more piece goods and utilizing an evaluation unit to determine the difference between the two weights.

Advantageous embodiments and developments of the invention are further achieved by having the weighing region of the weighing device greater than or equal to the greatest provided total weight of the piece good, having the piece good or the groups of piece goods whose weight is to be determined fed to the weighing receptacle in succession with respect to the conveying direction, having the weight detected during the movement of one or more piece goods, having the weight of one or more piece goods detected during standstill, having the weight of one or more piece goods detected during standstill with movement of all the piece goods located on the weighing device taken place beforehand, having the weighing device comprise a conveying unit having the conveying unit of the weighing device in the form of a weighing belt, having a control unit provided for the conveying unit of the weighing device in which the control unit is designed to discharge or feed individual piece goods or a number of piece goods to be jointly weighed, having a transport unit arranged downstream of the weighing device with the conveying speed of the transport unit greater than the conveying speed of the conveying unit of the weighing device, having a transport belt arranged downstream and/or upstream of the conveying unit of the weighing device, having a feed unit with means for spacing apart individual piece goods or individual groups of a specific number of piece goods, having the feed unit comprise a pushing device, having the pushing device with two or more pushing elements, having the pushing elements disposed at a greater distance in the pushing direction than the external dimensions of the piece goods to be weighed, having a labeling device, having a weighing unit, providing a feed unit to the weighing device as well as a discharge unit from a processing station of a production machine or installation having an additional monitoring unit for monitoring the piece goods, utilizing a method in which two or more piece goods are fed to the weighing receptacle and jointly weighed on the weighing receptacle and then successively removing individual piece goods or groups of piece goods from the weighing receptacle and then successively weighing the weight of individual piece goods or groups of piece goods on the receptacle and then using an evaluation unit to determine the difference between the weight of one piece good or the group of piece goods from the group weight of a group of piece goods or to utilize an alternative method in which the weight of two or more piece goods are determined by the steps of successively feeding two or more piece goods whose weight is to be determined to a weight receptacle successively weighing and then discharging two or more piece goods from the weighing receptacle and then employing an evaluation unit to determine the difference between two weight values.

Accordingly, a weighing device for a production machine or installation for determining the weight of the individual piece goods or individual groups of piece goods within a production line with scales which have a weighing receptacle for two or more piece goods is distinguished in that means for feeding two or more piece goods to the weighing receptacle and for jointly weighing the two or more piece goods and means for successively discharging individual piece goods to be weighed or groups of piece goods to be weighed with subsequent weighing of the weight remaining on the weighing receptacle are provided, with an evaluation unit being provided for determining the weight of a piece good or the group weight of a group of piece goods from the difference between two weight values.

In another embodiment of the invention, a corresponding weighing device is characterized in that means for successively feeding two or more piece goods to the weighing receptacle with successive weighing of the weight which is located on the weighing receptacle and means for subsequently discharging two or more piece goods which are located on the weighing receptacle are provided, with an evaluation unit being provided for determining the weight of an individual piece good or the group weight of a group of piece goods from the difference between two weight values.

In the first embodiment, all piece goods to be jointly weighed are fed to the weighing receptacle and then successively removed from the weighing receptacle individually or in groups, depending on the weight values to be detected. However, in the second embodiment, the piece goods to be weighed are successively fed individually or in groups until the maximum number of piece goods to be jointly weighed are located on the weighing receptacle. Discharge from the weighing unit can then take place simultaneously or in succession without a weighing operation entirely or for a large number of piece goods without further weighing.

In both cases, firstly processing of piece goods within a large belt width with respect to the size of said piece goods is possible, that is to say the entire holding capacity of the weighing apparatus can be utilized, even in the case of relatively small piece goods. In addition, the throughput primarily of relatively small piece goods can be increased compared to an individual weighing operation by virtue of the measures according to the invention, since weighing can also take place with two or more piece goods on the weighing receptacle.

Furthermore, the production line in both cases is less complex overall. In the first case, a separating device upstream of the weighing device is dispensed with; in the second case, sorting or grouping devices can, in certain circumstances, be dispensed with since allocation of the piece goods can be performed as early as on the weighing device. In the process, both the individual and group weight, and also the total weight, can be detected in each case.

By virtue of the inventive design of the weighing device, it is possible to use a relatively large weighing unit even in the case of small piece goods on account of the fact that a plurality of piece goods are weighed at the same time as the total weight of said piece goods is determined.

To this end, the weighing region of the weighing unit is advantageously designed to be so large that the weighing region of the weighing device is greater than or equal to the greatest occurring total weight of the piece goods.

The weight of the individual piece goods or a specific number (group) of piece goods to be jointly weighed can then be advantageously determined in that the individual piece goods or the corresponding number of piece goods to be jointly weighed are fed to the weighing station or discharged from said weighing station in succession. In the process, the weight to be determined is given by the change in the weight of the piece goods which are located on the weighing station which is varied by discharging or feeding the piece good or piece goods to be weighed. This change can be mathematically determined by subtracting two weights, preferably by subtracting two weights which are detected in succession. This procedure can also be repeated several times in order to determine a plurality of different weights.

In a production machine or installation according to the invention, two or more piece goods are advantageously jointly fed to the weighing device, with an individual piece good or a number (group) of piece goods to be jointly weighed being discharged from the totality of the piece goods which are located on or in the weighing device. The individual weight of the discharged piece goods or the total weight (group weight) of said number of discharged piece goods can then be determined by subsequent weight determination of the remaining piece good or the remaining piece goods on the basis of the reduction in weight caused by the discharge.

This weight reduction is, as already mentioned, mathematically determined in an evaluation unit by subtracting two preferably successively detected weight values. In the process, the total weight which is determined after the discharge of the individual piece goods to be weighed or, if the weight of a number of piece goods is to be determined, after the discharge of the number of piece goods to be weighed is in each case subtracted from the previously determined total weight.

Jointly feeding two or more piece goods, for example packages of products, to the weighing station renders a separating device upstream of the weighing device superfluous, as a result of which a compact construction of the production machine or installation is achieved.

In a particularly advantageous embodiment of the invention, the weight is detected during the movement of one or more piece goods.

Such a dynamic weighing method during the movement of the piece goods permits, as specified above, faster throughput compared with cyclical operation, with the result that integration of the weighing device in the production machine or installation is simplified. In the abovementioned exemplary embodiment, the discharge of the piece goods is accordingly operated continuously, and so the weights to be detected are detected during the transportation and in particular during the discharge of the piece goods from the weighing device.

In this case, the discharge can also be operated at a moderate speed with a high throughput (throughput=piece good(s)/minute) in the case of small piece goods, and so speed-related interference can be avoided during the weighing process.

In addition to the abovementioned dynamic weight detection, the weight of one or more piece goods can also be detected during standstill. Weighing during standstill ensures that no interference caused by the movement of the piece goods can occur during the weighing process.

In this case, all the piece goods which are located on the weighing device are preferably moved beforehand, with the movement preferably being horizontally directed. This measure represents an example of how the piece goods can be successively discharged and/or fed on the weighing device by the movement.

In a preferred embodiment, the weighing device or the weighing station is provided with a conveying unit, for example a circulating belt, which is driven continuously or intermittently. The conveying speed or the circulating speed in the case of continuous operation or the cycle speed in the case of intermittent operation is to be defined here such that enough time remains for the subsequent weight determination after feeding or discharge of the piece goods, whose weight is to be ultimately determined, to/from the weighing receptacle or the weighing belt.

In this case, continuous operation, in which the piece good or the piece goods are weighed during the transportation movement, has the additional advantage that the piece goods are not subjected to any cycle-related acceleration or braking processes, and so problems caused by this cannot occur at all and, in particular, the position of the piece good on the weighing receptacle or the weighing belt remains undisturbed by such processes.

A transportation unit for transporting away the piece goods is preferably arranged downstream of the weighing device. In this case, the conveying speed of the downstream transportation unit is advantageously selected to be greater than the conveying speed of the conveying unit of the weighing device. As a result, the piece goods are accelerated during the transfer of the piece goods from the conveying unit of the weighing device to the downstream transportation unit, as a result of which the piece goods are removed more rapidly from the weighing device. If, for example, the weighing device is provided with a weighing belt for conveying the piece goods, which weighing belt transfers the piece goods to a downstream transportation belt, the piece goods are thus accelerated to a certain extent by the downstream, faster-running transportation belt and in the process pulled down more quickly from the weighing belt.

This embodiment is advantageous particularly in the case of dynamic weighing since the dead time, that is to say the time which is required to remove the piece goods and in which weighing cannot be performed, is shortened by virtue of this measure. Furthermore, separation is performed downstream of the weighing device on the downstream transportation unit by virtue of this measure and this may be utilized in an advantageous manner.

Feeding and/or discharge onto the weighing receptacle, in particular onto a weighing belt, are/is preferably carried out such that the piece goods or the groups of piece goods to be weighed are arranged in succession. This permits largely continuous operation, particularly in conjunction with the above-mentioned dynamic weighing method.

However, the conveying unit of the weighing device, particularly in the form of a weighing belt, can also be designed with multiple lanes, and so even piece goods which are passed to the weighing belt lying next to one another in a row transverse to the transportation direction can be discharged from the weighing belt individually in succession. Devices of this type can, for example, be realized by a plurality of circulating belts or bands which circulate beside one another and have separately controllable drives.

The control system of the weighing station is to be matched to the type of feed and discharge of the piece goods. Care should particularly be taken that the respective unit, which can comprise one or more controllable drives, is driven as mentioned above in such a way that the individual piece goods to be weighed or the desired number of piece goods to be jointly weighed can be discharged from or fed to the weighing station separately, in order to be able to use the described subtraction weighing method.

In order to implement an additional labeling function, a labeling unit can be arranged downstream of the weighing device if required. The transportation of products to or through the labeling unit is realized in this case by means of a corresponding transportation unit, for example by means of a transportation belt. The labeling unit can be supplied firstly with the weight information about the piece goods to be marked and secondly be synchronized with the flow of the piece goods to be labeled either via a control unit which is common to the weighing unit or else via corresponding data and control signal interchange between various hard-wired control units or control units which communicate in a wire-free fashion.

If required, a sorting unit can be arranged downstream of a weighing unit according to the invention if piece goods are to be sorted as a function of weight. This is particularly advantageous if the piece goods should be of the same weight but deviations sporadically occur. In this case, piece goods with a deviating weight can be separated from the piece goods which have the same weight by operating the sorting device.

As mentioned above, it is important for the described weighing method for the individual piece goods or the desired number of piece goods to be jointly weighed to be discharged from the weighing device in succession. To this end, a prespecified distance between individual piece goods or individual groups of a specific number of piece goods to be jointly weighed is required when a continuously circulating weighing belt is used. This prespecified minimum distance is necessary in order to provide sufficient weighing time for the weight to be subsequently determined after a piece good has left the weighing belt and before the next piece good is discharged from the weighing belt. Furthermore, a minimum distance of this type ensures that the piece goods do not obstruct one another during discharge from the weighing belt, as would be possible, for example, in the case of piece goods which abut against one another or lie one partially on the other.

In order to maintain the desired position of the piece goods with the prespecified minimum distance, the feed unit which feeds the piece goods in their entirety to the weighing station is preferably correspondingly formed. To this end, the feed unit can be provided, for example, with a plurality of pushing elements, with each pushing element engaging on an individual piece good and pushing this piece good onto the weighing device. The desired minimum distance between the individual piece goods can then be set by virtue of a correspondingly distance between the pressure elements, which distance is selected to be greater than the dimensions of the piece good in the pushing direction by the desired distance.

In this case, the flexibility of the device in terms of different size of the piece goods can be ensured, for example, by adjustable or exchangeable pushing elements.

However, in order to solve the positioning problem on the weighing belt, other feed units are also feasible; for example grabbers or suction lifting means which deposit the piece goods in the desired position can be used.

A weighing device according to the invention can be particularly advantageously integrated in a production machine or installation since an upstream separating unit is not required. In this case, a weighing station according to the invention can be charged with the all the piece goods which are to be delivered and are provided by the production machine or installation without problems in a cycle of a production machine or installation, without complicated buffers or separating units having to be interposed. It is only necessary to match the operating speed of the weighing device to the operating speed of the production machine or installation or its last processing station.

A weighing device of this type can therefore be integrated directly in the delivery path of a production machine or installation.

In one particular embodiment of the invention, one or more further monitoring units for monitoring the piece goods produced by the production machine or installation according to the invention are additionally provided. Monitoring units of this type can serve for additional quality assurance. Such monitoring units can, for example, be provided in the form of a metal detector which serves to monitor for metallic foreign bodies. Depending on the application, visual monitoring may also be expedient in order to check the piece goods for complete marking or, fundamentally, for the desired appearance. A leakage station can also be provided as an additional monitoring unit.

BRIEF DESCRIPTION OF THE SEVERAL VIEWS OF THE DRAWING(S)

Figure 2:
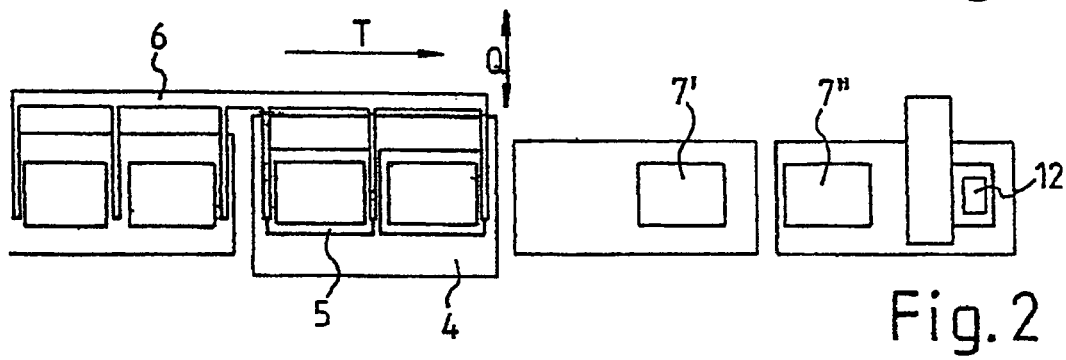
Figure 3:
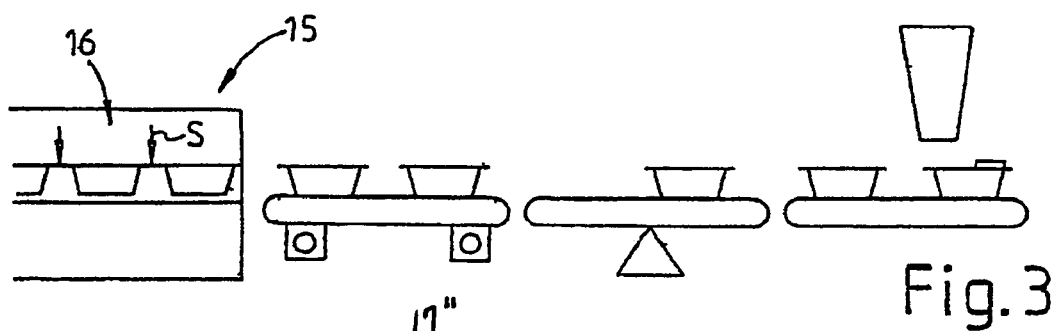
Figure 4:
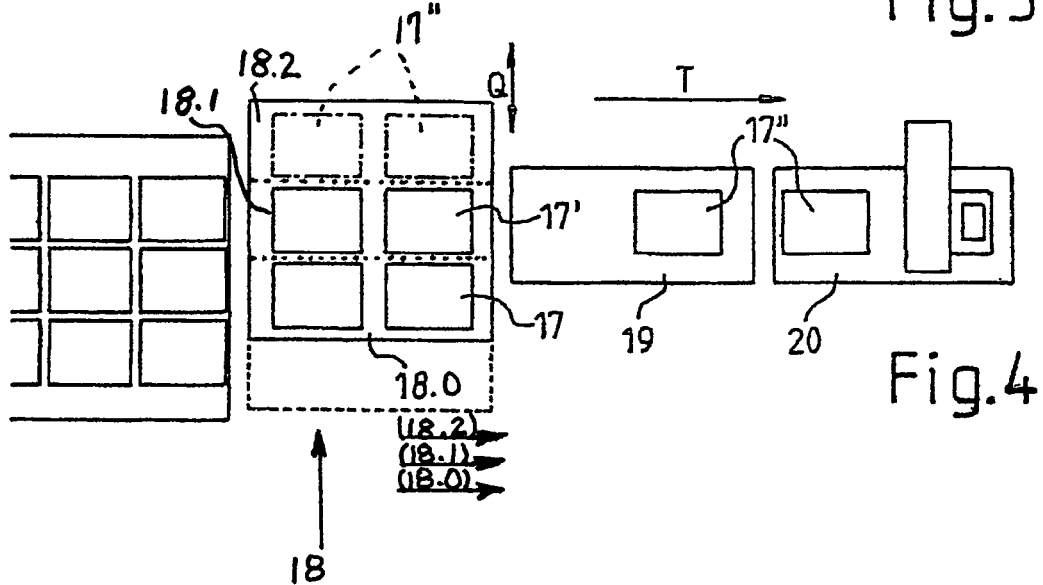
Figure 5:
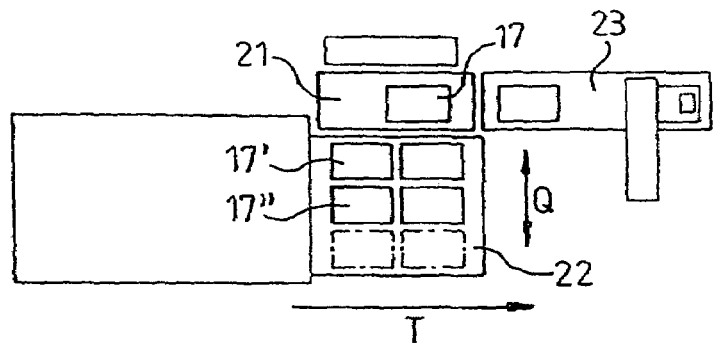
Figure 6:
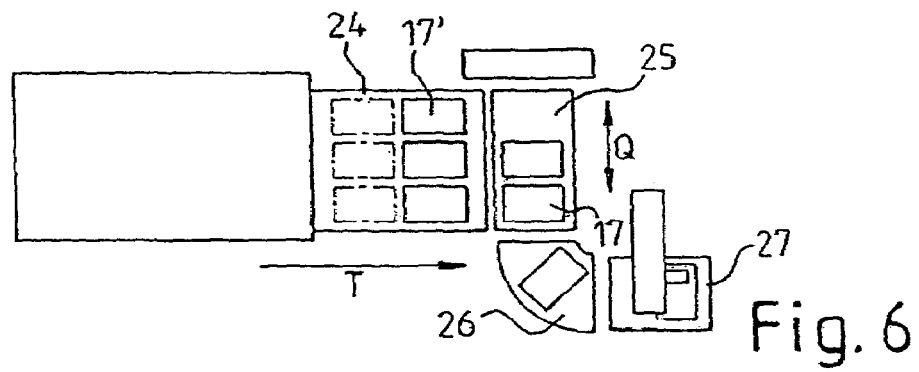
Figure 7:
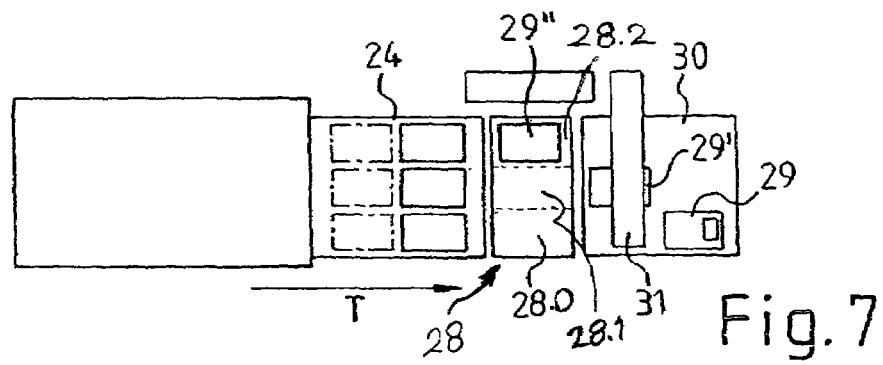
Figure 8:
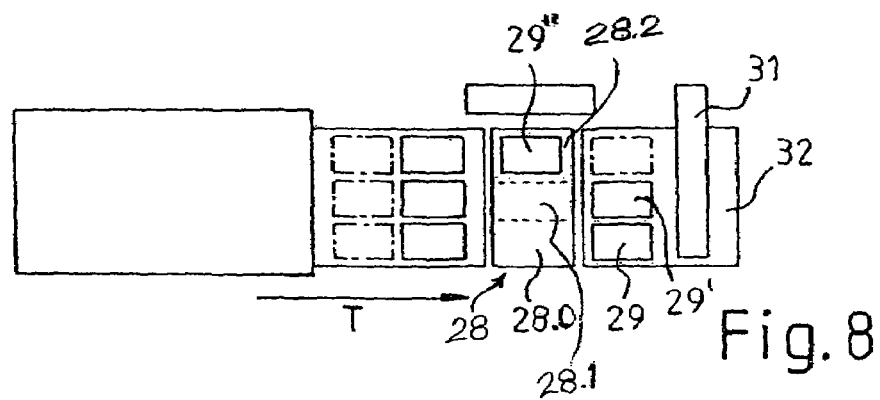

Various exemplary embodiments of the invention are illustrated in the drawing and explained in greater detail below with reference to the figures, in which FIG. 1 shows a schematic side view of a first embodiment of the invention, FIG. 2 shows a plan view of a design according to FIG. 1, FIG. 3 shows a side view of a second embodiment of the invention, FIG. 4 shows a plan view of a design according to FIG. 3, FIG. 5 shows a plan view of a third embodiment of the invention, FIG. 6 shows a plan view of a fourth embodiment of the invention, FIG. 7 shows a plan view of a fifth embodiment of the invention, and FIG. 8 shows a plan view of a sixth embodiment of the invention.

DETAILED DESCRIPTION OF THE INVENTION INCLUDING BEST MODE

The side view from FIG. 1 illustrates part of a packaging machine 1 as a production machine or installation according to the invention. The packages produced by the packaging machine 1 represent an example of piece goods to be weighed according to the invention. The figure shows the rear end of a filling belt 2, in which the product to be packaged is filled into individual trays 3, for example made of plastic.

A tray receptacle 4 which can be laterally displaced in the direction Q (cf. FIG. 2) and has a lifting unit 5 in order to lower the trays 3 into the tray receptacle and lift said trays out of the tray receptacle 4 is located downstream of the filling belt 2 in the transportation direction T A pushing unit 6 is located above the rear end of the filling belt 2 and the tray receptacle 4. The pushing units 6 is able to simultaneously displace a plurality of, in the present case two, trays 7 from the tray receptacle 4 onto a downstream weighing belt 8 and two trays 3 from the filling belt 2 onto the tray receptacle 4.

Such an arrangement is known, for example, in many machines (so-called tray sealers) in which individual separate trays are filled and sealed. In this case, the tray receptacle 4, together with the trays 7 located therein, is displaced in the lateral direction Q into a sealing station (not illustrated in any detail) and then, after sealing, moved back into the illustrated position for transporting away the sealed trays 7. In this case, two tray receptacles 4 which move in opposite directions can also be provided in order to seal the trays of tray receptacle while the other tray receptacle is cleared and recharged.

In the present exemplary embodiment, the pushing unit 6 as the feed unit according to the invention accordingly displaces two sealed trays 7 jointly onto the weighing belt 8.

A marking belt 9, above which a labeling unit 10 is arranged, is arranged downstream of the weighing belt 8. The labeling unit 10 is able to print out labels and attach them to the packages 11 to be labeled. A label 12 of this type is illustrated in the figures by way of example.

In the illustration according to FIGS. 1 and 2, only one package 7' is located on the weighing belt 8. This is the result of the trays 7', 7" being successively conveyed from the weighing belt 8 onto the marking belt 9.

Accordingly, before the illustrated state, the two trays 7', 7" were jointly located on the weighing belt onto which they were pushed by the pushing unit 6. The tray 7" was already conveyed onto the marking belt by virtue of the conveying movement of the weighing belt 8 and the marking belt 9.

The weight of the tray 7" already discharged by the weighing belt 8 is determined by an evaluation unit which operates as follows. Initially, the total weight $$G_{tot} = \sum_{i=1}^{n} G_i$$

where $G_{tot}$ is the total weight, $G_i$ is the weight of the i-th tray and at present n=2, of the two trays 7' and 7" was determined.

To this end, the weighing region of the weighing belt is to be matched to this total weight, that is to say $\geq G_{tot}$.

In the illustrated state, after the further transportation of the tray 7" onto the marking belt 9, the individual weight $G_1$ of the tray 7' which is now solely located on the weighing belt can be ascertained. Therefore, the weight $G_2$ of the previously discharged tray 7" is known at the same time by subtracting said individual weight $G_1$ from the total weight $$G_2 = G_{tot} - G_1$$

with the result that said tray can be provided with the corresponding weight information by the labeling unit 10.

If more than two trays are passed onto the weighing belt for the total weight, the individual weight $G_n$ can be successively determined in the above-described manner since in each case the total weight not including the individually discharged packages is subtracted from the previously determined weight including the package discharged last. In general, this gives the following formula $$G_n = \sum_{i=1}^{n} G_i - \sum_{i=1}^{n-1} G_i.$$

The same method can also be used for groups with a specific number of packages if only the total weight of such a number of packages and not the individual weight of the associated packages is to be determined.

The method thus described is called the subtraction method in the text which follows.

The pushing unit 6 comprises various pushing elements 13, 14 which are at a greater distance than the external dimensions of the packages 7 in the transportation direction T. When the pushing unit 6 is used, the packages 7 come to a stop against the respective pushing elements 13, 14, so that as a result a defined distance is produced between the trays 7', 7" during transportation onto the weighing belt 8. This distance ensures that the trays 7', 7" can be discharged separately from the weighing belt 8 without interfering with one another, and the described weighing processes are therefore made possible.

The embodiment according to FIG. 3 corresponds to an arrangement with a so-called web-fed machine or thermoforming machine for producing the packages to be weighed. This production machine or installation 15 produces a large number of connected packages which are separated from one another in a cutting station 16 by a cutting process. The cutting process is indicated by the arrows S in FIG. 3.

In a production machine or installation 15 of this type, a large number of packages 17 are accordingly always provided in one cycle. In the present exemplary embodiment, in each case six packages 17 are provided in two rows and three lanes in relation to the transportation direction. This matrix-like arrangement of the packages 17 is initially passed onto a sliding belt which can be displaced in the lateral direction Q transverse to the transportation direction T. The sliding belt 18 comprises individual belts or individual bands 18.0, 18.1 and 18.2 as illustrated in FIG. 4 in order to drive the packages 17, 17', 17" which are associated with one lane independently of the packages of the other lanes in the transportation direction T as indicated by arrows 18.0, 18.1 and 18.2. In this way, the packages 17, 17', 17" are in each case separately conveyed onto a downstream weighing belt 19, said packages being placed in front of the weighing belt 19 by corresponding lateral displacement of the sliding belt 18 in the direction Q.

At the time illustrated in FIG. 4, two packages 17" from the first lane have already been passed from the sliding belt 18 onto the weighing belt 19. Subsequently, a package 17" has already been transported further onto the marking belt 20. Furthermore, the sliding belt 18 has moved further in the lateral direction Q, with the result that now the package 17' of the next lane is ready to be fed onto the weighing belt 19. By repeating these processes, the packages 17 the last lane can then also be fed from the sliding belt 18 to the weighing belt 19.

The weighing process itself and also the labeling operation are then performed using the above-described subtraction method.

The design variant according to FIG. 5 corresponds substantially to the abovementioned exemplary embodiment, but with the weighing belt 21 now being arranged next to a delivery belt 22. The packages are now fed to the weighing belt 21 from the delivery belt 22 which circulates in the transportation direction T and from which in each case the packages 17, 17', 17" of one lane of the packages provided in one working cycle are fed to the weighing belt 21 in the lateral direction Q. To this end, a pushing device (not illustrated in any detail) which can move in the lateral direction Q can be provided. The weighing process on the weighing belt 21 and the downstream marking belt 23 is again carried out using the above-described subtraction method.

The design variant according to FIG. 6 again corresponds substantially to the two above-mentioned exemplary embodiments, but with the delivery belt 24 now circulating in the transportation direction T and the weighing belt 25 being arranged downstream of the delivery belt 24 such that it circulates in the lateral direction Q.

In this design variant, in each case one row of packages 17, 17' are jointly fed to the weighing belt by the delivery belt 24 being advanced. Therefore, three packages 17 are temporarily located on the weighing belt 25, two of which are shown in the illustrated exemplary embodiment. One of the packages is discharged from the weighing belt 25 in the lateral direction Q onto a curved conveying element 26 with a downstream marking belt 27.

The weighing process itself is again carried out using a subtraction method. Initially, all three packages 17 which are located on the weighing belt 25 are weighed and the total weight is thus determined. After discharge of the first package 17 onto the curved conveying element 26, the total weight of the remaining two packages 17 is weighed, with the individual weight of the already discharged package 17 being ascertained by subtraction from the previously ascertained total weight. The two packages 17 which are still are located on the weighing belt 25 are determined in the above-described manner by likewise ascertaining the total weight and subtracting the subsequently ascertained weight value.

In this design, the labeling process is completed as described above.

The exemplary embodiment according to FIG. 7 shows an arrangement which is comparable with respect to the delivery belt 24 and the weighing belt 28. However, the weighing belt 28 is now designed for a multiple-lane drive, that it to say it comprises at least three belts or bands 28.1, 28.2 and 28.3 which circulate next to one another, with the result that the packages 29, 29', 29" of one row can be successively discharged from the weighing belt 28 onto the marking belt. In this case, the labeling unit 31 is likewise of multiple-lane design, with the result that each package 29, 29', 29" which passes through can be provided with the corresponding weight information.

The weighing process itself is again carried out by means of the above-described subtraction method in which in each case the individual weight of a discharged package is ascertained by subtracting the remaining total weight from the previously ascertained total weight.

The embodiment according to FIG. 8 corresponds substantially to the design according to FIG. 7, with the marking belt 31 now being operated cyclically. Therefore, the marking belt 31 stays still until all the packages 29, 29', 29" of one row are discharged onto the marking belt 31 from the weighing belt 28 having multiple belts or bands 28.0, 28.1 and 28.2. All the packages 29, 29', 29" are then simultaneously labeled on the marking belt in one joint pass beneath the multiple-lane labeling unit 31.

The illustrated exemplary embodiments exhibit various options for the use of weighing devices according to the invention in production machines or installations. All the exemplary embodiments share the common feature that the feed unit is designed to jointly feed two or more packages to the weighing unit, and the discharge unit is designed to discharge individual packages or individual groups of packages to be weighed, with the weight of the jointly fed packages being determined.

LIST OF REFERENCE SYMBOLS

1 Production machine or installation
2 Filling belt
3 Tray
4 Tray receptacle
5 Lifting unit
6 Pushing unit
7 Tray
8 Weighing belt
9 Marking belt
10 Labeling unit
11 Labeled package
12 Label
13 Pushing element
14 Pushing element
15 Production machine or installation
16 Cutting station
17 Package
18 Sliding belt
19 Weighing belt
20 Marking belt
21 Weighing belt
22 Delivery belt 23 Marking belt
24 Delivery belt
25 Weighing belt
26 Curved conveying element
27 Marking belt
28 Weighing belt
29 Package
30 Marking belt
31 Labeling unit
32 Marking belt

What is claimed is:

1. A weighing device for a production machine or installation for determining the weight of individual piece goods or individual groups of piece goods within a production line with scales which have a weighing receptacle for two or more piece goods comprising a conveying unit for jointly feeding two or more piece goods to the weighing receptacle and for jointly weighing the two or more piece goods and means for successively discharging individual piece goods to be weighed or groups of piece goods to be weighed with subsequent weighing of the weight remaining on the weighing receptacle and an evaluation unit for determining the weight of a piece good or the group weight of a group of piece goods from a difference between two weight values.

2. A weighing device for a production machine or installation for determining the weight of individual piece goods or individual groups of piece goods within a production line with scales having a weighing receptacle for two or more piece goods comprising a conveying unit for the piece goods with means for successively feeding the two or more piece goods to the weighing receptacle with successive weighing of the weight which is located on the weighing receptacle and means for subsequently discharging jointly the two or more piece goods which are located on the weighing receptacle and an evaluation unit for determining the weight of an individual piece good or the group weight of a group of piece goods from the difference between two weight values.

3. The device as claimed in claim 1 wherein the weighing receptacle (8) provides a weighing range greater than or equal to the greatest provided total weight of the piece good (7', 7").

4. The device as claimed in claim 1 wherein the piece goods or the groups of piece goods, whose weight is to be determined, can be fed to the weighing receptacle (8) in succession with respect to the conveying direction.

5. The device as claimed in claim 1 wherein the weight is detected during the movement of one or more piece goods (7, 7', 7").

6. The device as claimed in claim 1 or 5 wherein the weight of one or more piece goods is detected during standstill.

7. The device as claimed in claim 1 wherein the weight of one or more piece goods is detected during standstill, with movement of all the piece goods located on the weighing device having taken place beforehand.

8. The device as claimed in claim 1 wherein the conveying unit is a weighing belt (8).

9. The device as claimed in claim 1 further comprising a control unit for the conveying unit (8) said control unit providing a discharge or feed of individual piece goods (7', 7") or a number of piece goods to be jointly weighed.

10. The device as claimed in claim 1 further comprising a transportation unit for transporting away the piece goods disposed downstream of the weighing receptacle and the conveying speed of said transportation unit is greater than the conveying speed of the conveying unit (8).

11. The device as claimed in claim 1 wherein a transportation belt (23) is arranged downstream and/or upstream of the conveying unit and weighing receptacle (8).

12. The device as claimed in claim 1 further comprising a feed unit (6) for spacing apart individual piece goods (7', 7") or individual groups of a specific number of piece goods.

13. The device as claimed in claim 12 wherein the feed unit includes a pushing device (6).

14. The device as claimed in claim 13 wherein the pushing device (6) has two or more pushing elements (13, 14).

15. The device as claimed in claim 14 wherein the pushing elements (13, 14) are at a greater distance than the external dimensions of the piece good (7, 7', 7") to be weighed in the pushing direction (T).

16. The device as claimed in claim 1 further comprising a labeling device (10).

17. The device as claimed in claim 1 wherein said device is disposed in a production machine or installation.

18. The device as claimed in claim 17 wherein said production machine or installation further comprises a feed unit (6) to the weighing device (8) which works at the same time as a discharge unit from a processing station of the production machine or installation.

19. The device as claimed in claim 17 wherein said production machine or installation has a monitoring unit for monitoring the piece goods.

20. A method for weighing piece goods which are provided by a production machine or installation, comprising the step of feeding jointly two or more piece goods to a weighing and conveying receptacle and jointly weighing the goods on the weighing and conveying receptacle, and then successively removing individual piece goods to be weighed or groups of piece goods to be weighed from the weighing and conveying receptacle and then weighing a weight remaining on the conveying and weighing receptacle and employing an evaluation unit to determine the difference between two weight values to obtain the weight of one piece good or the group weight of a group of piece goods.

21. A method for weighing piece goods which are provided by a production machine or installation, comprising the steps of successively feeding the two or more piece goods to a weighing receptacle of a weighing device and successively weighing the weight which is located on the weighing receptacle and jointly discharging the two or more piece goods which are located on the weighing receptacle with a conveying unit of the weighing device with the weight of an individual piece good or a group weight of a group of piece goods being determined from the difference between two weight values by means of an evaluation unit.

22. A weighing device for determining the weight of individual piece goods or a group of piece goods in a production line comprising:
  (a) a combination weighing and conveying device for receiving two or more piece goods and then jointly weighing and then successively discharging individual or said two or more piece goods that have been jointly weighed to provide a first weight data to an evaluation unit;
  (b) subsequently weighing a number of piece goods remaining on said combination weighing and conveying device after successively discharging individual or said two or more piece goods that have been jointly weighed to provide a second weight data to said evaluation unit; and
  (c) an evaluation unit for determining the weight of an individual piece good or the group weight of a group of piece goods from the difference from said first weight data from said second weight data.

23. The device as claimed in claim 2 wherein the weighing receptacle (8) provides a weighing range greater than or equal to the greatest provided total weight of the piece good (7', 7").

24. The device as claimed in claim 2 wherein the piece goods or the groups of piece goods, whose weight is to be determined, can be fed to the weighing receptacle (8) in succession with respect to the conveying direction.

25. The device as claimed in claim 2 wherein the weight is detected during the movement of one or more piece goods (7, 7', 7").

26. The device as claimed in claim 2 wherein the weight of one or more piece goods is detected during standstill.

27. The device as claimed in claim 2 wherein the weight of one or more piece goods is detected during standstill, with movement of all the piece goods located on the weighing device having taken place beforehand.

28. The device as claimed in claim 2 wherein the conveying unit is a weighing belt (8).

29. The device as claimed in claim 2 further comprising a transportation unit for transporting away the piece goods disposed downstream of the weighing receptacle and the conveying speed of said transportation unit is greater than the conveying speed of the conveying unit (8).

* * * * *